United States Patent
Jacobson et al.

(10) Patent No.: US 6,954,965 B1
(45) Date of Patent: Oct. 18, 2005

(54) FORCED HOT AIR WINDSHIELD WIPER SYSTEM

(76) Inventors: Arnold P. Jacobson, 7 Redwing La., Carbondale, CO (US) 81623; Chi Chi L. Jacobson, 7 Redwing La., Carbondale, CO (US) 81623

( * ) Notice: Subject to any disclaimer, the term of this patent is extended or adjusted under 35 U.S.C. 154(b) by 156 days.

(21) Appl. No.: 10/279,537

(22) Filed: Oct. 25, 2002

(51) Int. Cl.$^7$ ............................................. B60S 1/54
(52) U.S. Cl. ..................... 15/250.04; 15/250.05; 15/250.351; 219/202; 219/203
(58) Field of Search .................. 15/250.04, 250.351, 15/250.07, 250.08, 250.05, 250.09, 250.02; 219/202, 203

(56) References Cited

U.S. PATENT DOCUMENTS

| | | | | |
|---|---|---|---|---|
| 1,656,473 A | * | 1/1928 | Darlington | 15/250.04 |
| 1,755,059 A | * | 4/1930 | Gallagher | 15/250.04 |
| 1,763,153 A | * | 6/1930 | Hobbins | 15/250.04 |
| 2,562,302 A | * | 7/1951 | Downey | 15/250.04 |
| 2,639,455 A | * | 5/1953 | Schwarzmann | 15/250.04 |
| 2,648,865 A | * | 8/1953 | Gordon et al. | 15/250.04 |
| 3,304,569 A | * | 2/1967 | Christensen | 15/250.04 |
| 3,371,368 A | * | 3/1968 | Walker | 15/250.04 |
| 3,447,186 A | * | 6/1969 | Senkewich | 15/250.04 |
| 3,591,887 A | * | 7/1971 | Keddie | 15/250.02 |
| 6,008,474 A | * | 12/1999 | Dumas | 219/203 |

FOREIGN PATENT DOCUMENTS

| | | | | |
|---|---|---|---|---|
| AT | 138060 | * | 6/1934 | 15/250.04 |
| DE | 1268506 | * | 5/1968 | 15/250.07 |
| DE | 2105774 | * | 9/1971 | 15/250.07 |
| DE | 3015221 | * | 11/1981 | 15/250.07 |
| FR | 1342327 | * | 8/1963 | 15/250.07 |
| GB | 402189 | * | 11/1933 | 15/250.07 |

* cited by examiner

*Primary Examiner*—Gary K. Graham
(74) *Attorney, Agent, or Firm*—James M. Deimen

(57) ABSTRACT

Windshield wiper apparatus is provided to substantially increase the amount of heat and the speed with which the heat is delivered to the wiper mechanism and blade to clean the ice and snow accumulation. Hot air is provided from either or both the exhaust system or a special electric heater directly into the modified windshield wiper and onto the windshield.

12 Claims, 2 Drawing Sheets

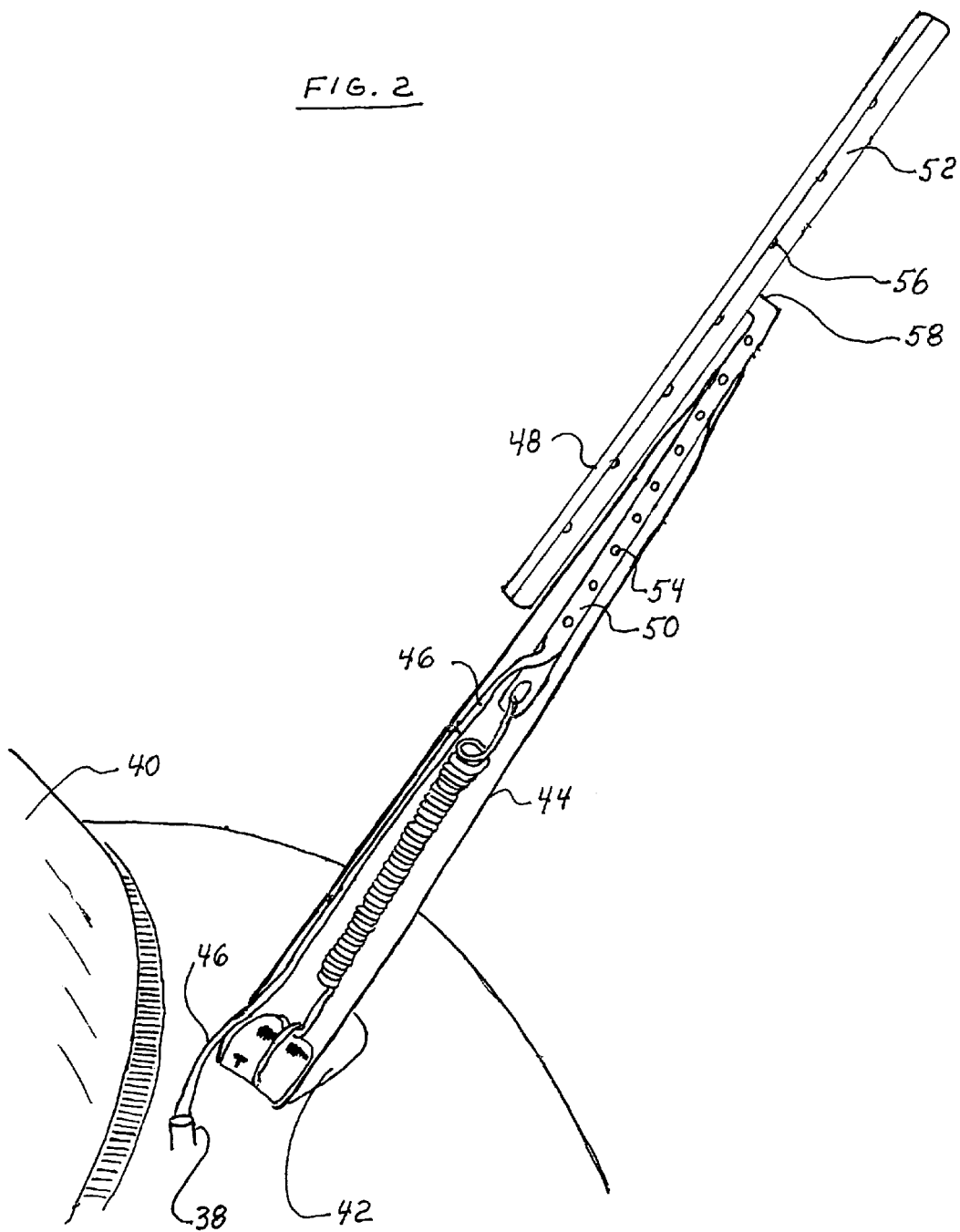

FORCED HOT AIR WINDSHIELD WIPER SYSTEM

BACKGROUND OF THE INVENTION

The field of the invention pertains to automobile and truck windshield wipers, and in particular to improvements to overcome the buildup on windshield wipers in freezing weather.

Most persons living in northern temperate regions and arctic regions have experienced the agony of frozen windshield wipers and the ice build-up on the windshield wipers and windshield in the winter. Heat from inside the vehicle, even with the defroster on, takes considerable time to penetrate outside to melt the ice and snow on the windshield. Heat from inside the vehicle is rarely effective to melt ice build-upon the wiper mechanism itself. Therefore, after starting the engine, one must exit the vehicle with the engine running, brave cold, wind and possibly traffic to break this ice on the wipers and scrape ice off the windshield.

Under sleet storm conditions, the ice build-up can be continuous while driving despite a warm vehicle interior and defroster. Build-up under sleet storm conditions can create an extremely hazardous driving situation at highway speeds. Therefore, there is a definite need to melt snow and ice accumulations on the windshield and windshield wipers much faster and more efficiently than with interior defrosters which is the current technology in common use.

Electric resistance heating wire affixed to the exterior or embedded in the rubber of the wiper blade has been tried; however, this approach to heating the wipers has not come into common use, perhaps because the heating is not sufficient to prevent build-up on the wipers metal mechanism.

SUMMARY OF THE INVENTION

The new invention comprises apparatus to substantially increase the amount of heat and the speed with which the heat is delivered to the wiper mechanism and blade to clear the ice and snow accumulation. The new apparatus blows hot air provided from either or both the exhaust system or a special electric heater directly in to the modified windshield wiper and onto the windshield. The exhaust system at or close to the exhaust manifold gets hot very quickly as does and electric heating coil. By carefully selecting the heater coil and providing a high output alternator or generator on the engine, most of the engine output can be utilized in the first few moments after starting the engine to heat air blown through conduits to and in the windshield wipers.

Thus, the vehicle driver can remain in the vehicle and merely turn on switches as necessary to activate the electric heater, open the apparatus to air flow and activate a fan to drive air through the apparatus.

BRIEF DESCRIPTION OF THE DRAWINGS

FIG. 2 illustrates the modified wiper blade mechanism.

DESCRIPTION OF THE PREFERRED EMBODIMENTS

Figure 1:
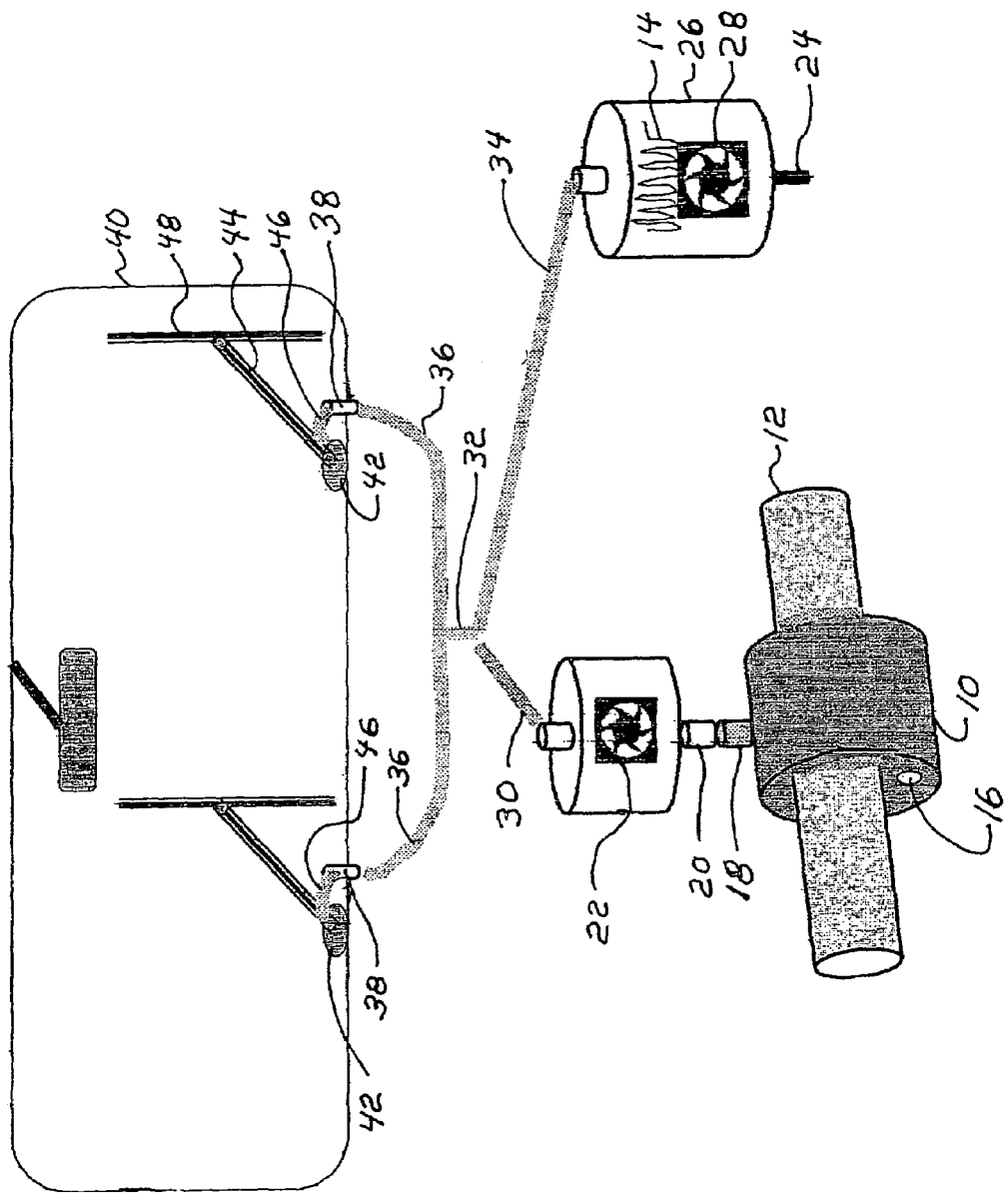
FIG. 1 illustrates the overall forced hot air windshield wiper system.

The basic system as illustrated in FIG. 1 comprises either an exhaust pipe around 10 fitted over the exhaust pipe 12 or an electric heater coil 14 as a quick heat source. The exhaust pipe shroud 10 includes an air inlet hole 16 and a hot air port 18 leading to a connector pipe 20 and fan 22 or compressor.

Similarly, the electric heater coil 14 is supplied with peak air through a port 24 in a coil container 26 equipped with a fan 28. A vehicle may be equipped with either heat source but preferably would be equipped with both to maximize warm-up speed.

Hot air from the fan 22 flows through the flexible heat resistant tubing 30 to a double wye at 32. Hot air from the coil container 26 flows through the flexible heat resistant tubing 34 also to the double wye at 32. From the double wye 32 a pair of flexible heat resistant tubes 36 lead to hood ports 38 just below the windshield 40 and adjacent to the pivots 42 for the windshield wiper arms 44. Short lengths of heat resistant tubing 46 connect the hood ports 38 to the wiper blade mechanism shown in detail in FIG. 2.

In FIG. 2 the modified wiper blade mechanism comprises the wiper arm 42 mounted on the pivot 42 and a rubber wiper blade 48 mounted on the arm. The modifications comprise a hollow perforated metal tube 50 mounted on the wiper arm 44 and a second perforated hollow metal tube 52 just above the rubber wiper blade 48. Either or both of the metal tubes 50 or 52 may form a part of the metal structure of the wiper blade mechanism or may be added to a conventional wiper blade mechanism.

Hot air is supplied from the hood port 38 through the flexible heat resistant tubing 46 to the metal tube 50. The arm perforations 54 in the metal tube 50 and the blade perforations 56 in metal tube 52 are sized to balance the flow from each perforation and prevent starved flow from the blade perforations. As shown the blade perforations 56 are located and shaped to direct hot air flow onto the rubber wiper blade 48. The arm perforations are located to blow hot air onto the windshield 40.

Where the metal tube 50 forms part of the structure of the arm 44 and the metal tube 52 forms the blade holder for the wiper blade 48 the connection between the metal tubes at 58 for hot air flow may be a part of the connection mechanism or there may be a short length of flexible tube there-between.

What is claimed is:

1. Apparatus to heat a windshield wiper blade and windshield comprising a first hollow perforated tube adjacent to and substantially parallel to the wiper blade, a second hollow perforated tube movable with a pivotally mounted wiper arm and in fluid communication with the first hollow perforated tube, said second hollow perforated tube comprising a part of the wiper arm extending outwardly from an end thereof and supporting said first tube, and a flexible heat resistant tubing in fluid communication with the second perforated tube at one end of the flexible heat resistant tubing and in communication with a source of pressurized hot air.

2. The apparatus of claim 1 wherein the first hollow perforated tube comprises a wiper blade holder.

3. The apparatus of claim 1 wherein an electric heater and fan comprise the source of pressurized hot air.

4. The apparatus of claim 1 wherein exhaust heat and a fan comprise the source of pressurized hot air.

5. The apparatus of claim 1 wherein a combination of an electric heater and first fan and exhaust heat and a second fan comprise the source of pressurized hot air.

6. The apparatus of claim 1 wherein the perforations in the first hollow perforated tube are generally directed toward the wiper blade.

7. The apparatus of claim 1 wherein the perforations in the second hollow tube are directed generally toward the windshield.

8. Apparatus to heat a windshield wiper blade and windshield comprising a hollow perforated blade holder,
- a hollow perforated tube forming a part of a pivotally mounted windshield wiper arm extending outwardly from an end thereof and supporting said blade holder, and in fluid communication with the hollow perforated blade holder,
- an electric heater and first fan, a container enclosing the heater and first fan, the container being in fluid communication with a wye, the wye being in fluid communication with the hollow perforated tube, and
- an exhaust pipe shroud and a second fan, the exhaust pipe shroud and second fan in fluid communication with the wye.

9. The apparatus of claim 8 including a second wye in fluid communication with the first wye, and a second hollow perforated blade holder and a second hollow perforated tube in fluid communication with the second wye.

10. The apparatus of claim 9 wherein the perforations in the hollow perforated tube are generally directed toward the windshield and the perforations in the hollow perforated blade holder are directed generally toward the wiper blade.

11. The apparatus of claim 8 wherein the perforations in the hollow perforated tube are generally directed toward the windshield.

12. The apparatus of claim 8 wherein the perforations in the hollow perforated blade holder are directed generally toward the wiper blade.

* * * * *